United States Patent [19]

Morley et al.

[11] Patent Number: 4,996,684
[45] Date of Patent: Feb. 26, 1991

[54] ELECTRONIC SYSTEMS AND EFFECTIVE REDUCTION OF ELECTROMAGNETIC INTERFERENCE ENERGY PROPAGATION FROM ELECTRONIC SYSTEMS

[75] Inventors: Robert S. Morley, Ottawa; Roland A. Smith, Nepean; Paul D. Sayre, Kanata, all of Canada

[73] Assignee: Northern Telecom Limited, Montreal, Canada

[21] Appl. No.: 376,105

[22] Filed: Jul. 6, 1989

[51] Int. Cl.⁵ .............................................. H04J 3/06
[52] U.S. Cl. .................................. 370/100.1; 375/108
[58] Field of Search ...................... 370/77, 100.1, 108; 375/108

[56] References Cited

U.S. PATENT DOCUMENTS

| | | | |
|---|---|---|---|
| 3,388,349 | 6/1968 | Ault | 375/108 |
| 4,069,399 | 1/1978 | Barrett et al. | 370/67 |
| 4,507,796 | 3/1985 | Stumfall | 375/106 |
| 4,679,867 | 7/1987 | Heldenbrand et al. | 312/287 |
| 4,873,682 | 10/1989 | Irwin et al. | 370/58.1 |

OTHER PUBLICATIONS

"Transmission Systems for Communications", Third Edition, Bell Telephone Laboratories Incorporated, 1964, (Ch. 19).
"Frequency Modulated Clock for Data Processor for Test for Electromagnetic Radiation and Electromagnetic Compatibility", IBM Technical Disclosure Bulletin, vol. 26, No. 1, Jun. 1983, p. 341.

Primary Examiner—Douglas W. Olms
Assistant Examiner—Melvin Marcelo
Attorney, Agent, or Firm—J. E. Moorhouse

[57] ABSTRACT

An electronic system includes at least one element which is operative in response to clock signal pulses, of less than a maximum frequency of occurrence, from a clock signal source. A dither means is connected to the clock signal source for causing the frequency of occurrence to be varied such that electromagnetic radiation which accompanies the normal operation of the system is of a lesser interference effect than if the frequency of occurrence were substantially monotonous.

2 Claims, 5 Drawing Sheets

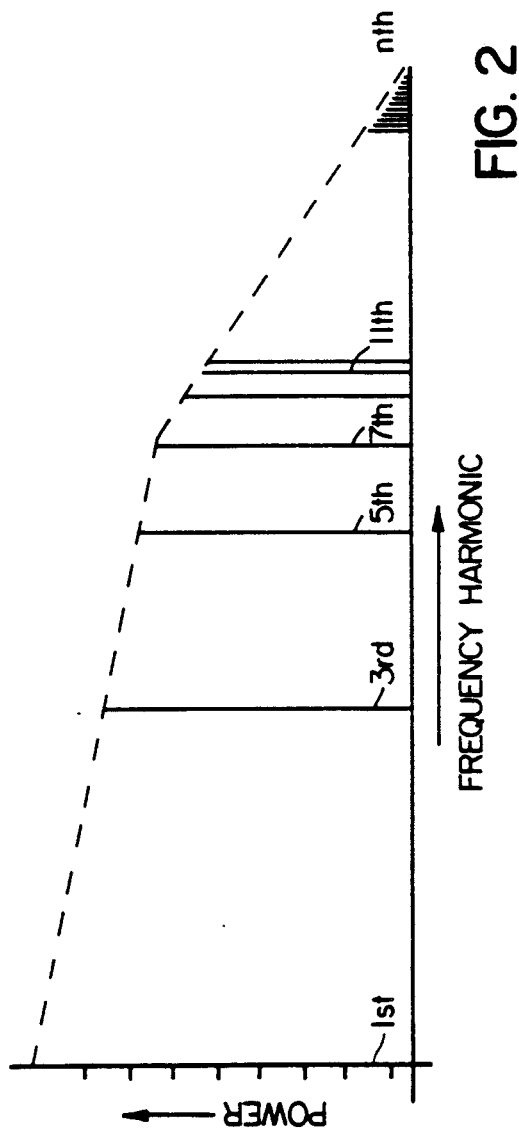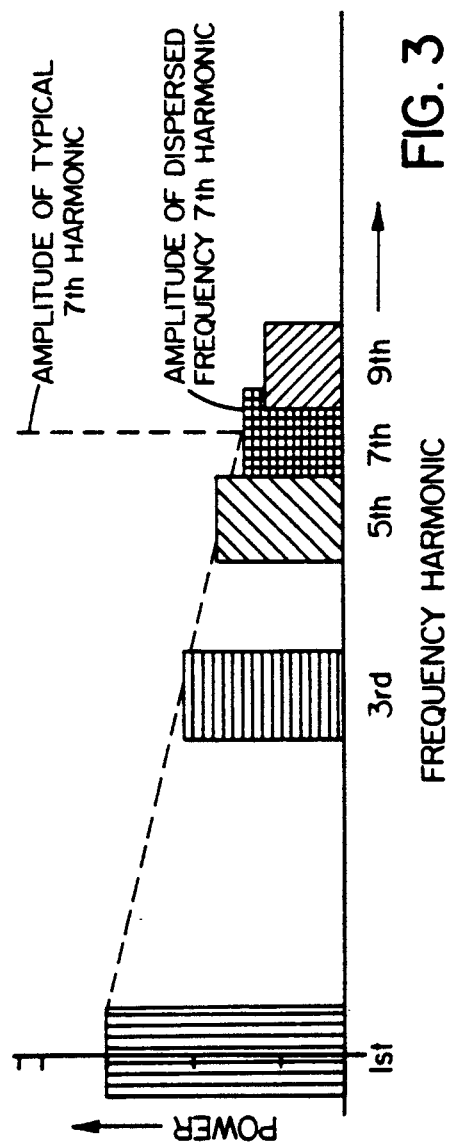

ELECTRONIC SYSTEMS AND EFFECTIVE REDUCTION OF ELECTROMAGNETIC INTERFERENCE ENERGY PROPAGATION FROM ELECTRONIC SYSTEMS

INTRODUCTION

The invention is in the field of electronic systems which rely upon clock signal pulses to regulate their pace of operation. More particularly the invention relates to effectively reducing the propagation of electromagnetic interference normally associated with the operation of electronic systems.

BACKGROUND OF THE INVENTION

Electronic systems, for example systems ranging from small personal computers to large central office telephone exchanges, characteristically generate and radiate electromagnetic interference. One of the sources of radiated electromagnetic interference is that portion of an electronic system which is characterized by a multitude of logic gates and bistable elements, often referred to as digital circuitry. During operation, the digital circuitry depends upon at least one source of clock signal pulses for an orderly timing of switching occurrences in the logic gates and bistable elements. An electromagnetic energy pulse accompanies each switching occurrence and propagates outwardly, away from the electronic system, directly through the air or space and also via any communications leads or power leads connected to the system. The effects of this energy upon other nearby electrical and electronic systems may vary greatly, however such effects are always deleterious. In extreme cases, electromagnetic interference has rendered an electronic system inoperative and in some rare instances an apparatus has been known to suffer sufficiently to be rendered inoperative even after the interference has been removed.

In view of the extremely serious consequences which may accompany electromagnetic interference, manufacturers have been forced, as a matter of practicality and at significant expense, to provide protection such as shielding of cabinets and cable runs, and filters for power and communications leads. The effect of this protection is to reduce both entry and egress of electromagnetic energy. One example of a cabinet design incorporating shielding is disclosed in U.S. Pat. No. 4,679,867 issued 14 July 1987 to S. Heldenbrand et al and titled "Cabinet for an Electronic Apparatus". Futhermore, in various countries national regulatory agencies have promulgated standards as to limits of permissable levels of electromagnetic radiation. Before an electronic apparatus may be sold or used, a supplier of the apparatus must have been able to demonstrate, to the satisfaction of the regulatory agency, that in normal operating circumstances the electronic apparatus does not radiate unwanted energy in designated frequency ranges in excess of the permissable levels. With the ever increasing densities of such electronic systems being brought into use in cities and towns, some of the regulatory agencies have been moved in recent years to further reduce the permissable levels of unwanted electromagnetic radiation, with the intent of stemming what might otherwise become a torrent of electromagnetic radiation pollution.

As is well known to persons of typical skill in the technology of digital circuit apparatus and systems, the generation of electromagnetic interference is a direct result of the clock synchronous manner in which these systems operate. Although a change of the conductive state of any one switch element is accompanied by only a minuscule amount of electromagnetic interference generation, millions of such devices all switching in step synchronism one with the other typically generate a substantial amount of potentially troublesome radiation. Recently larger digital apparatus such as main frame computers and telephone switching systems of old design and current manufacture have had to be redesigned or modified with retrofits in order to meet the more stringent requirements.

SUMMARY OF THE INVENTION

It is an object of the invention to modify electromagnetic interference typically radiated during operation of digital electronic equipment by dispersing concentrations of such radiation.

It is also an object of the invention to reduce the effects of electromagnetic interference radiations which normally emanate during operations of digital electronic equipment, for example an electronic telephone system.

The invention includes a method for operating a plurality of logic gates for performing a function in an electronic system. The method comprises the steps of generating clock signal pulses at a rate which is changing from moment to moment, and switching each logic gate of the plurality of logic gates between electrical logic states, as appropriate for performing said function and at times limited by and in synchronism with occurrences of the clock signal pulses. A rate of change is selectable whereby electromagnetic radiation originating in the electronic system during its operation is of lesser interference effect than would be so if the clock signal pulses were generated at a substantially monotonous rate.

In one example in accordance with the invention, an electronic system includes a digital processor, having input and output port means, and being operable in response to energizing current and clock signal pulses of up to and including a maximum frequency of occurrence, for executing processor functions in synchronism with the pulse occurrences. A clock signal source generates the clock signal pulses at a predetermined frequency of occurrence being less than said maximum frequency of occurrence, and a dither means is connected to the clock signal source means for causing the frequency of occurrence to be varied about the predetermined frequency of occurrence such that an average of the frequency of occurrence corresponds to the predetermined frequency of occurrence. The input and output port means comprises a synchronous receiver transmitter being operable for coupling digital signals with the digital processor in response to clock signal pulses from a plurality of clock signal sources including said clock signal source means.

In another example, an advantage of the invention can be realized in a communication system having a TDM network operated at a predetermined rate as directed by a digital controller which is operated at a continuously varying rate.

In a further example, the invention resides within an electronic telephone system for selectively coupling telephone station sets and the like, in communication one with another as directed by a central processing means, which includes a digital processor, for directing call progresses between ports of a time division multiplex switching network. The electronic telephone system includes:

a clock signal source means for generating clock signal pulses at a predetermined frequency of occurrence being less than a maximum frequency of occurrence;

dither means, connected to the clock signal source means for causing the frequency of occurrence to be varied about the predetermined frequency of occurrence such that an average of the frequency of occurrence corresponds to the predetermined frequency of occurrence; and sequence signal generating means for generating channel and frame timing signals for regulating switching and transmission operations of the time division multiplex switching network, in response to the clock signal pulses, whereby a radiated electromagnetic energy byproduct, associated with the normal operation of the electronic telephone system, is dispersed over a wider frequency spectrum than would otherwise be so.

In yet a further example of the electronic telephone system, one of the ports is a digital port for receiving communications signals from a digital signals communication path. In this example the electronic telephone system further includes a synchronizing means being connected between the time division multiplex switching network and the digital port. The synchronizing means is responsive to the clock signal pulses from the clock signal source, and to timing information associated with the received communication signals, for transferring information contained therein to the time division multiplex switching network. More specifically the synchronizing means comprises an elastic memory of a predetermined memory capacity. The elastic memory includes: a write port for receiving the information content of the received communications signals from the digital port, in synchronism with said timing information; a read port for transmitting the information content having been received at the write port, to the time division multiplex switching network, in synchronism with said clock signal pulses, and means for generating an overflow signal in an event of more than a maximum fraction of the predetermined memory capacity becoming occupied by the information content from the digital port. In this example the clock signal source means is operable for causing the frequency of occurrence to be momentarily increased, in response to an occurrence of the overflow signal, and thereby reduce the fraction of memory capacity being occupied.

An example of an electronic clock in accordance with the invention includes a controllable oscillator and an alternating signal source. The oscillator is operable for generating a clock signal, the frequency of which is varied in response to an alternating signal from the alternating signal source. The alternating signal may be of a sawtooth wave form, a triangular wave form or of a pink noise nature. A ratio of a minimum rate of change of the frequency of the clock signal taken over the highest fundamental frequency component of the alternating signal from the alternating signal generator is preferred to be greater than 0.05.

BRIEF DESCRIPTION OF THE DRAWINGS

Example embodiments are discussed with reference to the accompanying drawings in which:

FIG. 2 is a graphical representation exemplary of spectoral frequency distribution of periodic clock signal pulses as generated during operation of a typical digital electronic system;

FIG. 3 is a graphical representation, exemplary of spectoral frequency distribution of dithered periodic clock signal pulses as generated during operation in accordance with the invention, of the electronic system illustrated in FIG. 1;

DESCRIPTION OF THE PREFERRED EMBODIMENTS

In the accompanying drawings, elements thereof are labeled for convenient reference in the description. Some of the figures include elements which are common to several figures, and in these cases the illustrated elements are identified with corresponding reference labels. Furthermore, details which are of common knowledge to those of typical skill in digital electronics, such as supply and distribution power and specific examples of implementation of functional elements, are illustrated only in so far as is convenient to exemplify the invention.

Figure 1:
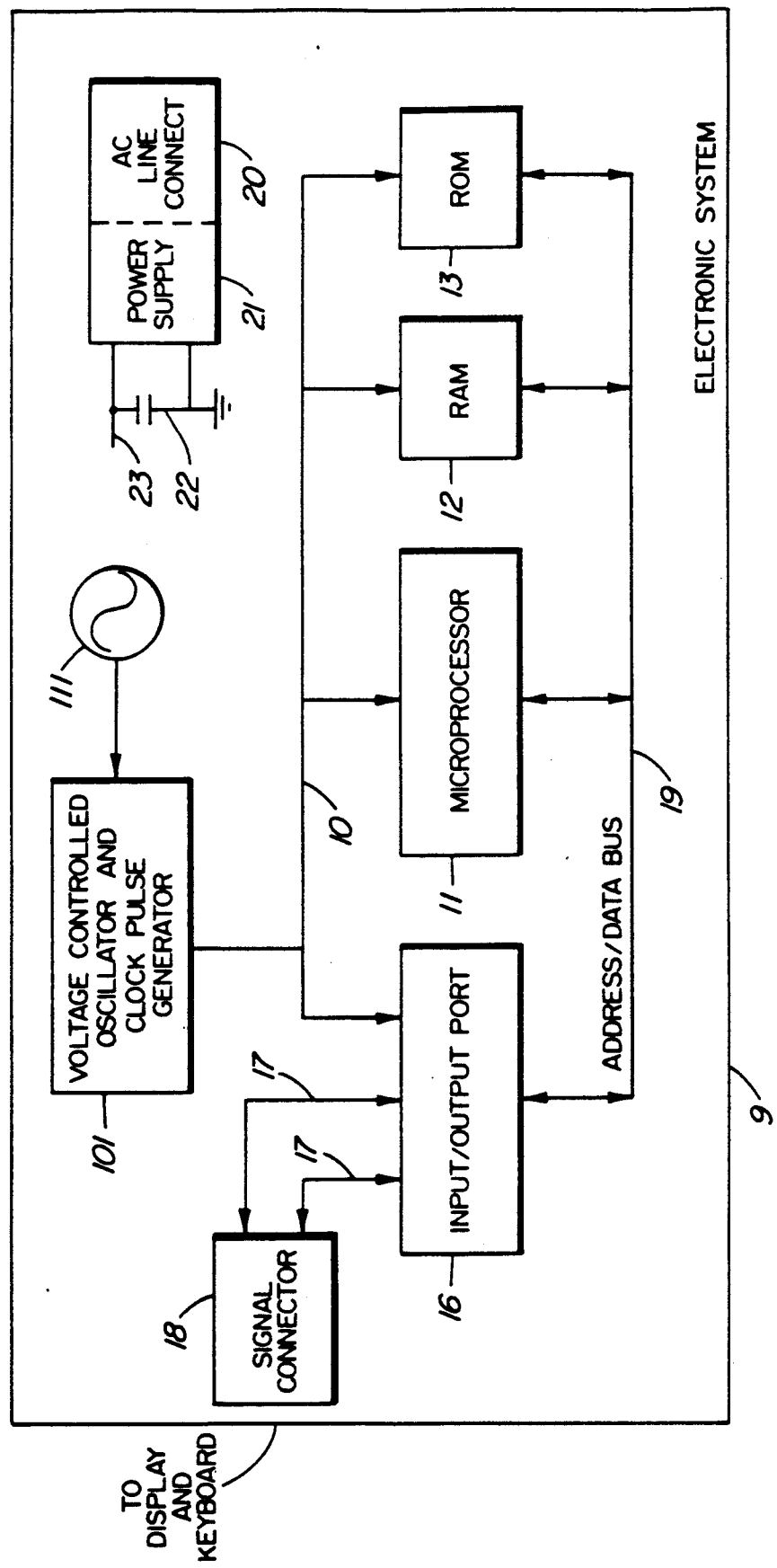
FIG. 1 is a block schematic diagram of an electronic system

The electronic system illustrated in FIG. 1 is contained within a cabinet 8 and includes various logic elements connected, via a timing lead 10, to a clock. In this example the frequency modulated clock is provided by a voltage controlled oscillator 101 and an alternating current signal generator 111 connected to cause a frequency of occurrence of clock signal pulses from the voltage controlled oscillator 101, to be continuously varied. The cabinet 8 is usually constructed of an electrically conductive material, or at least includes a conductive coating for the purpose of impeding any traversing fields or electromagnetic energy. The various logic elements include a $\mu$ processor 11; a random access memory (RAM) 12; a read only memory 13; and an input/output port 16; all interconnected by an address-/data bus 19, as shown. The input/output port 16 is provided with access outside of the cabinet 8 via signal buses 17 and a signal connector 18. A power supply 21 acts as a source of energizing current which is distributed to the various logic elements via a power lead 23. The power supply 21 is connectable via a line connector 20 to receive power from a source outside of the cabinet 8. For simplicity of illustration, some details characteristic of digital electronic systems are not shown or are shown in an abbreviated form. For example, the power lead 23 is only partially shown and of several capacitors 22 which are normally distributed along the power leads of any such system, only one is likewise illustrated.

In operation, as is well understood by persons of typical skill in the art of digital electronic circuits, the generation of electromagnetic interference is a direct result of the clock synchronous manner in which these circuits operate. Although a change of the conductive state of any one logic element is accompanied by only a minuscule amount of electromagnetic interference generation, such devices all switching in step synchronism one with the other generate an accumulative electromagnetic disturbance which tends to propagate, but which may be substantially restricted to the interior of the cabinet 8. Such restriction is typically achieved for example, by selection of appropriate material for construction of the cabinet 8 and by providing the connectors 18 and 20 with filters of the lowest practical pass bands. However such restriction is not without significant expense, which can rise in proportion to both the size of a system, and the number of leads and the nature of the leads which are required to be connected through the boundary of the cabinet. It is typical practice to operate such systems with a stable clock source of the signal pulses, for example to achieve a consistently optimum functional throughput while avoiding any abberations which might from time to time clock a system at a rate at which it is unable to perform satisfactorily. This practice has the effect of generating electromagnetic radiation with energy concentrations at the fundamental frequency of the clock signal pulse occurrences and at several harmonics thereof, as typified in FIG. 2. (FIGS. 2 and 3 each include a vertical axis representative of power and a horizontal axis representative of frequency.) On the other hand, when the operation of the oscillator 101 is varied by the alternating signal source, the energy concentrations may be dispersed somewhat as exemplified in FIG. 3. The dispersion of energy is an inherent consequence of varying the frequency of the oscillator 101, as is illustrated for example in chapter 19 of "Transmission Systems For Communications", Third Edition, published by Bell Telephone Laboratories, Incorporated, in 1964. In a system operated with clock pulse repetition frequencies in a range between 11 and 12 megahertz, with a deviation of about 250 KHz at a modulating frequency of about 100 KHz, tests indicate that at least 6 decibels reduction of electromagnetic interferences as compared to the same system in which the clock is of a monotonous frequency.

Figure 4:
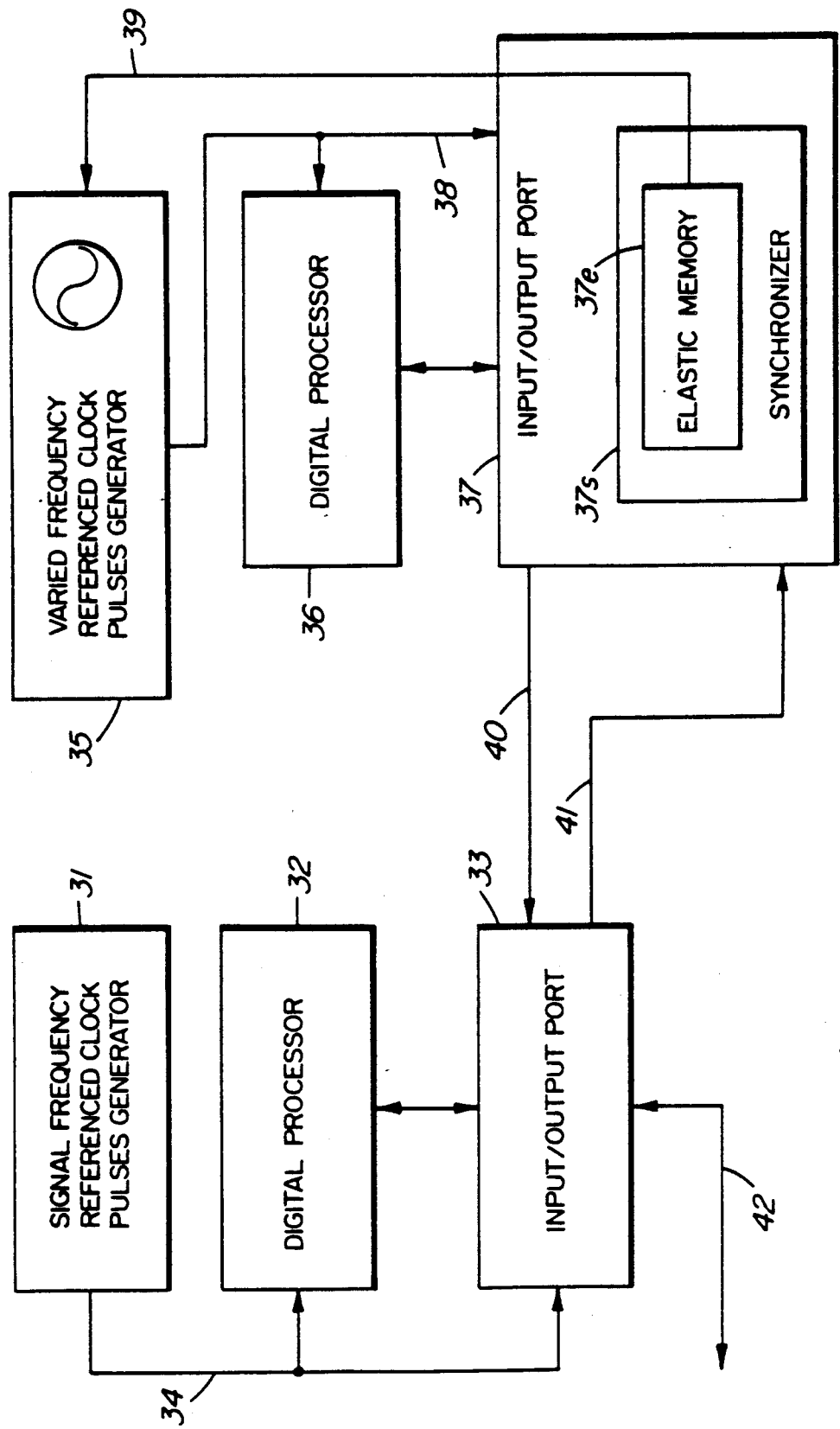
FIG. 4 is a block schematic diagram of an electronic system similar to, but more extensive than, the electronic system in FIG. 1.

In FIG. 4, the electronic system includes a plurality of digital signal processors, namely a digital processor 32 and a digital processor 36, each being connected to an input/output port 33 and an input/output port 37 respectively. A clock pulse generator 31 is connected via a clock lead 34 to provide clock signal pulses to the digital processor 32 and the input/output port 33 for their operations. Likewise another timing signals source, in this case a dithered clock pulse generator 35, is connected to provide timing signal pulses via a clock lead 38 for operations of the digital processor 36 and the input/output port 37. In one example of operation, the input/output port 33 may exchange data via a communications line 42 in a synchronous manner or in an asynchronous manner. In the synchronous manner the rate of data transmission and reception occurs in lock step with the frequency of the clock signal pulses or at some submultiple thereof. This is in contrast to the asynchronous manner wherein the rate of data transmission and reception is related to the clock rate only to the extent that the data transmission and reception must occur at a rate of less than half the frequency of the clock signal pulses and usually the rate is less than a third of the frequency of the clock signal pulses. The input/output port 33 also communicates with the input/output port 37 via a data line 40 and a data line 41, in this example at the synchronous rate. The average frequency of the timing signal pulses from the dithered clock pulse generator 35 ideally corresponds to the frequency of the clock signal pulses from the clock pulse generator 31, however as before discussed, the instantaneous frequency is varied to disperse the frequencies of unwanted electromagnetic emissions. Therefore the input/output port 37 must perform to capture the individual data bits received from the data line 41 and to make this information available to the digital processor 36 in synchronism with the varying rate of the pulses from the dithered clock pulse generator 35. Hereafter this or any similarly varied pulse rate is referred to as a dithered clock. In order to perform the required function, the input/output port 37 includes a synchronizer 37s which in turn includes an elastic memory 37e. The elastic memory 37e is a well known device which is operable to receive data bits into a storage space, dependent upon a write clock, and to transmit data bits from the storage space, dependent upon a read clock. Such devices are sometimes referred to as a FIFO, a first in first out memory, and usually are provided with empty and full signal ports either of which becomes asserted, in operation, when the storage space is nearing either an empty or a full state, respectively. The write clock in this case is provided by the synchronizer 37s which generates same from timing information inherent in the data from the data line 41. The read clock is provided on the clock lead 38. In this example a signal assertion at the full port of the elastic memory 37e is put to advantageous use in that the full port is connected to the dithered clock pulse generator via a lead 39. The dithered clock pulse generator 35 is arranged to be responsive to the signal assertion at the full port, to momentarily accelerate the rate of pulse generation, and so prevent data loss which might otherwise occur in the elastic memory 37e.

Figure 5:
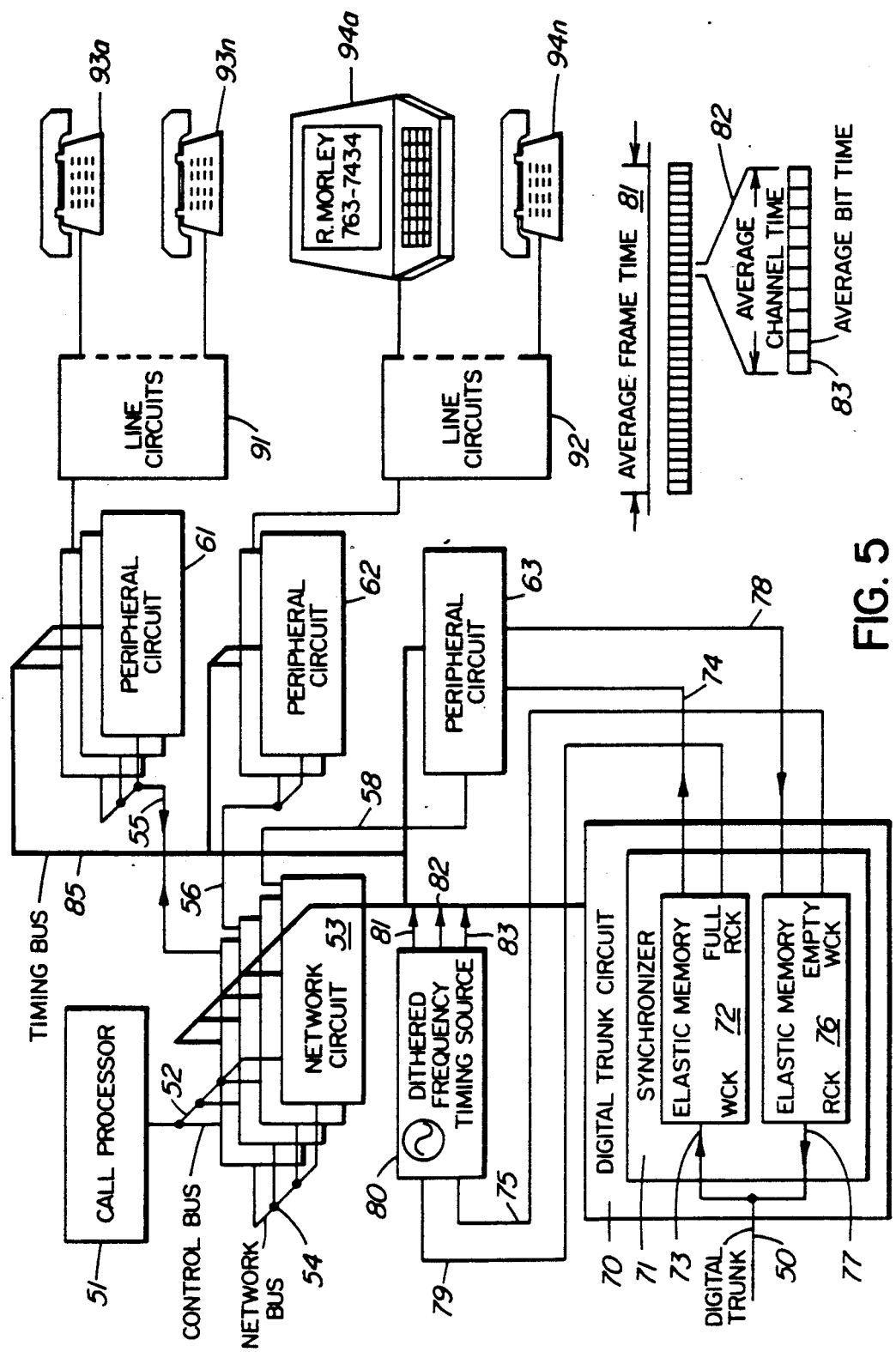
FIG. 5 is a block schematic diagram of an electronic telephone system in accordance with the invention.

The telephone system illustrated in FIG. 5, provides communications services for telephone station sets terminals and the like at 93a-93n and 94a-94n, via a line circuit group 91 and a line circuit group 92 respectively. The line circuit group 91 is connected to one peripheral circuit of a peripheral circuit group 61, and the line circuit group 92 is connected to one peripheral circuit of a peripheral circuit group 62. A digital trunk 50 is coupled to the telephone system by a digital trunk circuit 70 which is connected to another peripheral circuit group 63 via a receive lead 74 and a transmit lead 78. Each of the peripheral circuits provides selective channel access to a network bus 54 via a respective network circuit in a group of network circuits 53, under the direction of a call processor 51, connected to the group of network circuits 53 by a control bus 52. In order to provide access, each peripheral circuit of the peripheral circuit group 61 is connected to one of the network circuits of the group of network circuits 53 by a TDM loop 55 which carries thirty-two bidirectional time division multiplex channels and connection addressing information. Similar TDM loops 56 and 58 connect the peripheral circuit group 62 and the peripheral circuit group 63 to respective network circuits of the group of network circuits 53. Timing for operation of the network bus 54, the group of network circuits 53, the peripheral circuit groups 61, 62 and 63 is generated in a dithered frequency timing source 80. The frequency modulated timing source 80 generates frame, channel, and bit timing signal pulses on leads 81, 82 and 83 respectively, to define a time division multiplex byte interleaved operating format as exemplified in the lower right hand portion of FIG. 5. The system illustrated is of a general form of which there are many different examples, one being published in U.S. Pat. No. 4,069,399 issued on 17 Jan. 1978, to Bruce Barrett et al and titled "A TDM PCM Communication System", and another being published in U.S. Ser. No. 126,710 filed on 30 Nov. 1987, now U.S. Pat. No. 4,873,682 to George Irwin et al and titled "Digital Key Telephone System". Hence the particulars of the illustrated system are discussed only so far as the use of the dithered frequency timing source 80 in the system is used to achieve some frequency dispersal of the electromagnetic radiation byproduct of system operation.

In operation, telephone lines connecting any of the station sets, terminals and the like are effective radiators of electromagnetic energy. Their effectiveness is somewhat proportional to the frequencies associated with the rate of the system operation and the harmonics thereof, and with the length of each telephone line conductor residing within the cabinetry enclosing the system. In the system illustrated in FIG. 5, this effect is materially reduced by the use of the dithered frequency timing source 80 which in this case is arranged to generate bit timing pulse signals having an average frequency corresponding to a bit rate of the digital trunk 50. This is achieved in combination with the digital trunk circuit 70 which includes an elastic memory 72 and an elastic memory 76. The elastic memory 72 functions to transfer information bits from the regular signal format of the receive path 73 of the digital trunk 50 to the somewhat irregular signal format of the receive lead 74, while the elastic memory 76 functions to perform the reverse function between the transmit lead 78 and the transmit path 77 of the digital trunk 50. The synchronizer 71 generates clock pulses at the operating rate of the digital trunk 50. These are supplied at a write input (wck) of the elastic memory 72, and at a read input (rck) of the elastic memory 76, such that writing and reading of the memories 72 and 76 are achieved respectively with reference to the operating rate of the digital trunk 50. Likewise bit timing pulses provided by the dithered frequency timing source 80 on the timing bus 85 are applied at read (rck) and write (wck) inputs of the respective elastic memories 72 and 76 to synchronize reading from the elastic memory 72 and writing into the elastic memory 76 with the operating signal format of the telephone system. The frequency modulated timing source 80 is urged to follow on average the operational rate of the digital trunk 50 in response to assertions of full and empty signals on full and empty leads 79 and 75, in a manner similar to that discussed in relation to FIG. 4. Of course if no reference, such as from the digital trunk 50 is available, the frequency modulated timing source 80 may freerun or operate with reference to some other internal clock source such as that which is normally contained within the call processor 51.

Figure 6:
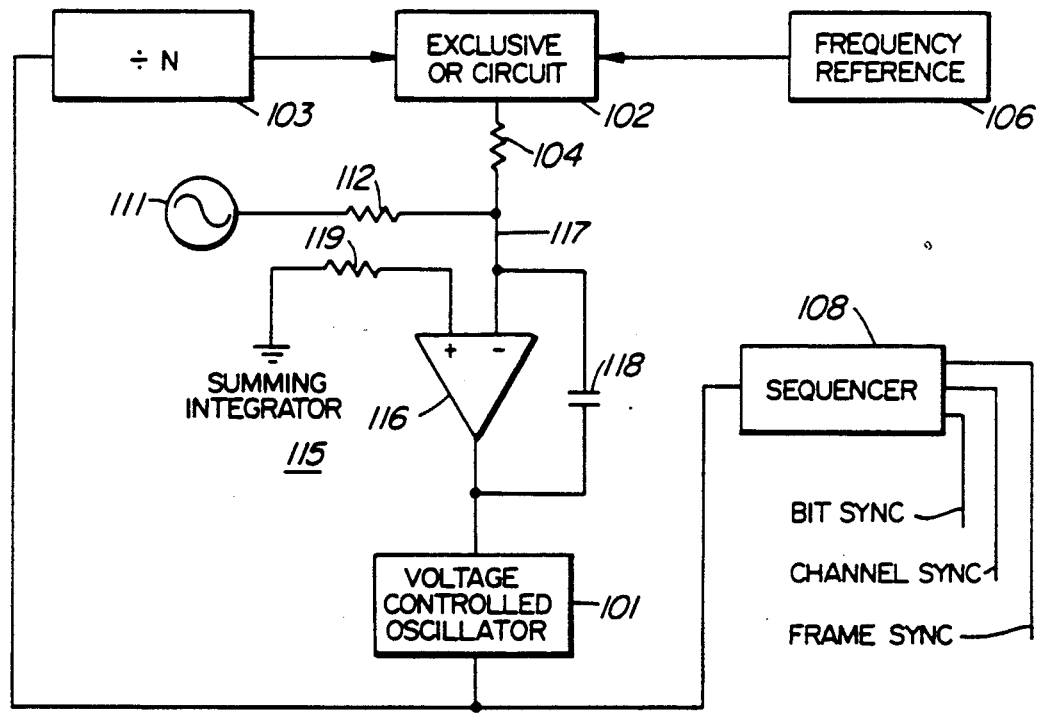
FIG. 6 is a block schematic diagram of a timing apparatus useful for providing clock pulse signals for any of the electronic systems illustrated in FIGS. 1, 4 and 5.

The timing apparatus in FIG. 6 is one example of that which may be used to provide a dithered or dispersed frequency clock. In this figure, a voltage controlled oscillator 101 includes an output for supplying signal pulses to a divider circuit 103 and a sequencer 108. The sequencer utilizes the signal pulses to generate bit channel and frame synchronizing signals useful for operation of any associated communications system. The divider circuit 103 provides a scaled signal to an EXCLUSIVE OR circuit 102. The EXCLUSIVE OR circuit 102 may compare the scaled signal with a signal from a frequency reference source 106, if such is provided. In any case the output of the EXCLUSIVE OR circuit 102 alternates between binary states. In this example it is convenient that these binary states correspond to positive and negative potentials equally displaced from ground. The output of the EXCLUSIVE OR circuit 102 is connected to a summing point 117 of a summing integrator 115, by a resistor 104. An output of an alternating signal source 111 is likewise connected to the summing point 117. The summing integrator 115 is provided by an operational amplifier 116 sometimes referred to as a differential amplifier, and which includes an inverting input being connected by a resistor 119 to ground, a non-inverting input being connected to the summing point 117, an output being connected to an input of the voltage controlled oscillator 101, and a capacitor being connected between said output and the summing point 117. In operation at equilibrium, that is when the average frequency of the output of the voltage controlled oscillator 101 is the same as the signal from the frequency reference source 106 or when there is no such signal provided, the output signal from the EXCLUSIVE OR circuit 102 is a 50% duty cycle signal. Hence the only variations of significance which will cause the output signal to be dithered about the average operating frequency are those of a much lower frequency than the pulse signals from the EXCLUSIVE OR circuit 102. The alternating signal source 111 is arranged to provide such signals. In one example, about 100 KHz, has been found to be effective. However other wave shapes can be used, and in particular a pink noise generator also has been found to be effective when used as the alternating signal source 111.

Figure 7:
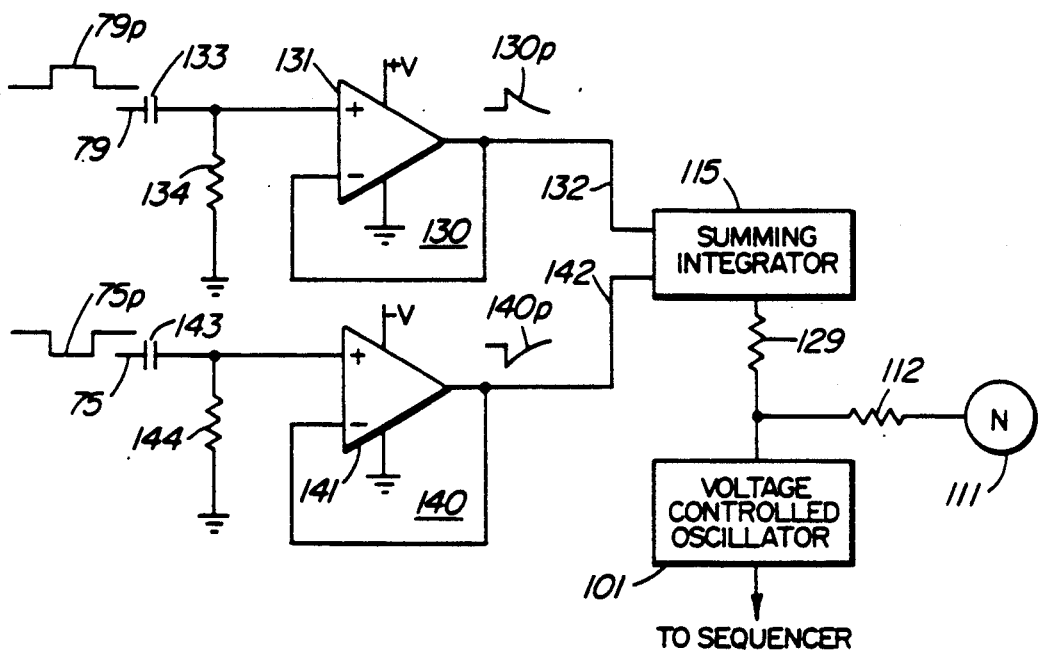
FIG. 7 is a block schematic diagram of a timing apparatus adapted to cooperate with a digital trunk interface apparatus as illustrated in FIG. 5, whereby communications information may be efficiently exchanged between a channel of a time division switching network in accordance with the invention and a digital communication signal path.

In FIG. 7 the clock source includes the summing integrator 115, the output of which is connected to the input of the voltage controlled oscillator 101 by a resistor 129. In this case the alternating signal source 111 is likewise connected to the voltage controlled oscillator 101 by the resistor 112. The inputs of the summing integrator 115 are connected by leads 132 and 142, to receive differentiations 130p and 140p of leading edges of the full and empty signals 79p and 75p as are available on the leads 79 and 75 which originate in the digital trunk circuit 70 in FIG. 5. In this arrangement the circuitry of FIG. 7 provides the dithered frequency timing source 80 in FIG. 5 such that the frequencies of the timing signals on the timing bus 85 are dithered about, while from time to time as needs be, said frequencies are adjusted to be greater or lesser and thus on average track with the operating rate of another telephone system trunk connected therewith.

What is claimed is:

1. An electronic telephone system, for selectively coupling telephone station sets and the like, in communication one with another as directed by a central processing means including a digital processor for directing call progresses between ports of a time division multiplex switching network wherein one of said ports is a digital port for receiving communications signals from a digital signals communication path, the electronic telephone system comprising:

clock signal source means for generating clock signal pulses at a predetermined frequency of occurrence being less than a maximum frequency of occurrence;

dither means, connected to the clock signal source means for causing the frequency of occurrence to be varied about the predetermined frequency of occurrence such that an average of the frequency of occurrence corresponds to the predetermined frequency of occurrence;

sequence signal generating means for generating channel and frame timing signals for regulating switching and transmission operations of the time division multiplex switching network, in response to the clock signal pulses, whereby a radiated electromagnetic energy byproduct, associated with the normal operation of the electronic telephone system, is dispersed over a wider frequency spectrum than would otherwise be so; and a synchronizing means being connected between the time division multiplex switching network and the digital port, the synchronizing means being responsive to the clock signal pulses from the clock signal source and to timing information associated with the received communication signals, for transferring information contained therein to the time division multiplex switching network, the synchronizing means comprising:

an elastic memory of a predetermined memory capacity, the elastic memory including;

a write port for receiving the information content of the received communications signals from the digital port, in synchronism with said timing information;

a read port for transmitting the information content having been received at the write port, to the time division multiplex switching network, in synchronism with said clock signal pulses, and means for generating an overflow signal in an event of more than a maximum fraction of the predetermined memory capacity becoming occupied by the information content from the digital port; and wherein the dither means is operable for causing the frequency of occurrence to be momentarily increased, in response to an occurrence of the overflow signal, to reduce the fraction of memory capacity being occupied.

2. An electronic telephone system for selectively coupling telephone station sets and the like, in communication one with another as directed by a central processing means including a digital processor for directing call progresses between ports of a time division multiplex switching network, wherein one of said ports is digital port, for receiving communication signals from a digital signals communication path being operated with reference to timing of an external origin and for transmitting communication signals to the digital signals communication path from a channel in the time division multiplex switching network, the electronic telephone system comprising:

clock signal source means for generating clock signal pulses at a predetermined frequency of occurrence being less than a maximum frequency of occurrence;

dither means, connected to the clock signal source means for causing the frequency of occurrence to be varied about the predetermined frequency of occurrence such that an average of the frequency of occurrence corresponds to the predetermined frequency of occurrence; and sequence signal generating means for generating channel and frame timing signals for regulating switching and transmission operations of the time division multiplex switching network, in response to the clock signal pulses, whereby a radiated electromagnetic energy byproduct, associated with the normal operation of the electronic telephone system, is dispersed over a wider frequency spectrum than would otherwise be so;

a synchronizing means being connected between the time division multiplex switching network and the digital port, the synchronizing means being responsive to the clock signal pulses from the clock signal source and to timing information associated with the received communication signals, for transferring information contained in the received communications signals, to the time division multiplex switching network, and for transferring information contained in the channel in the time division multiplex switching network to the digital port;

the synchronizing means comprising:

a receive elastic memory of a predetermined memory capacity, the receive elastic memory including;

a write port for receiving the information content of the received communication signal from the digital port in synchronism with said timing information, a read port for transferring the information, having been received at the write port, to the time division multiplex switching network, in synchronism with said clock signal pulses, and means for generating a receive overflow signal in an event of more than a maximum fraction of the predetermined memory capacity is occupied by the information content from the digital port, and a transmit elastic memory of a predetermined memory capacity, the transmit elastic memory including;

a write port for receiving the signals from the channel in the time division multiplex switching network, in synchronism with said clock signal pulses, a read port for transferring information, having been received at the write port, to the digital port, in synchronism with said timing information, and means for generating a transmit overflow signal, in an event of more than a maximum fraction of the predetermined memory capacity is occupied by the signals from the time division multiplex switching network; and wherein the dither means is operable for causing the frequency of occurrence to be momentarily increased, in response to an occurrence of the receive overflow signal, and the dither means is operable for causing the frequency of occurrence to be momentarily decreased, in response to an occurrence of the transmit overflow signal.

* * * * *